No. 830,880. PATENTED SEPT. 11, 1906.
O. CARLSON.
DEVICE FOR REMOVING CLOTHES FROM WASHBOILERS.
APPLICATION FILED AUG. 16, 1905.
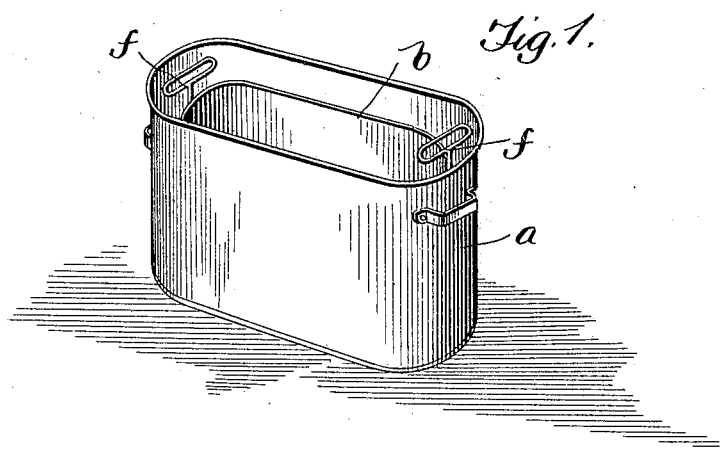
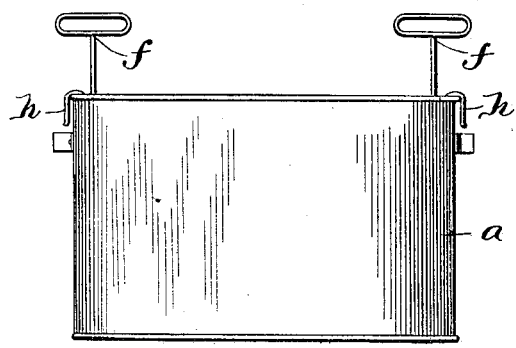
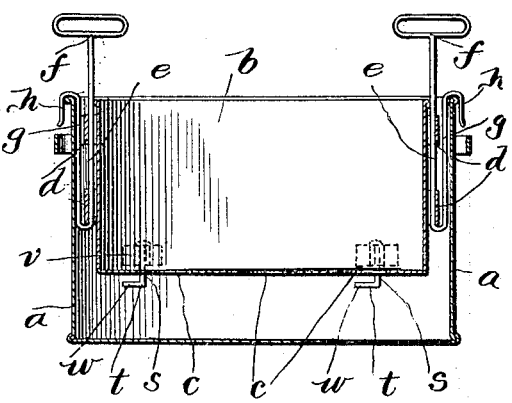
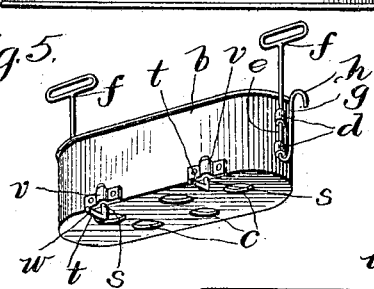
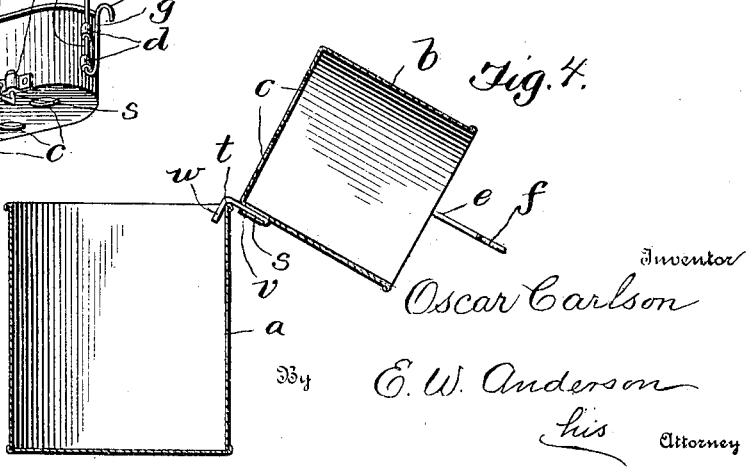
Witnesses:
R. A. Boswell.
George M. Anderson.
Inventor
Oscar Carlson
By E. W. Anderson
his Attorney
THE NORRIS PETERS CO., WASHINGTON, D. C.

UNITED STATES PATENT OFFICE.

OSCAR CARLSON, OF PINEBLUFF, WYOMING.

DEVICE FOR REMOVING CLOTHES FROM WASHBOILERS.

No. 830,880. Specification of Letters Patent. Patented Sept. 11, 1906.

Application filed August 16, 1905. Serial No. 274,351.

*To all whom it may concern:*

Be it known that I, OSCAR CARLSON, a citizen of the United States, and a resident of Pinebluff, in the county of Laramie and State of Wyoming, have made a certain new and useful Invention in Devices for Removing Clothes from Washboilers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the washboiler with my device for removing clothes let down within the same. Fig. 2 is a side elevation with the handles $f$ in engagement by the hooks thereof with the rim of the boiler and the vessel $b$ raised. Fig. 3 is a vertical longitudinal section of the same. Fig. 4 is a cross-section showing the vessel $b$ removed from the boiler and held by the gravity-hooks. Fig. 5 is a perspective view of the vessel $b$ and its lifting-handles.

The invention relates to devices for removing clothes from washboilers; and it consists in the novel construction and combinations of parts, as hereinafter set forth.

In the accompanying drawings the letter $a$ designates an ordinary washboiler, and $b$ an open-top vessel of similar shape to the boiler and designed to be placed inside of it. This vessel $b$ is of less vertical height than the boiler, and in its bottom are made large apertures $c$, which are designed to let the water drain out of the vessel when it is raised up sufficiently high in the boiler. The vessel $b$ is removable from the boiler and is provided at its ends with vertical tubular bearings $d$ for the shanks $e$ of the lifting-handles $f$. These shanks have upward-bent extensions $g$, terminating in reversely-bent hooks $h$, which when the handles are turned transversely lie flat against the end of the vessel, but when said handles are turned longitudinally or in the direction of the length of the vessel said hooks project outward in position to engage the rim of the boiler-wall at its ends. These reversed or downward-bent hooks are located intermediately of the length of the shanks, so that when they are in engagement with the rim of the boiler the vessel $b$ is held in raised position in said boiler.

In this manner it is designed to provide for the drainage of the water from the clothes in the vessel $b$ into the boiler. When the water has been drained out of the clothes sufficiently, the vessel $b$ is lifted, by means of the handles, in an inclined manner over the longitudinal wall of the boiler, the rim of which will be engaged by the gravity-catches $t$ at the base of said wall, so that the vessel $b$ can be turned downward to discharge the clothes. The gravity-catches $t$ have vertical shanks $s$, which are loosely pivoted in bearings $v$ of the wall of the boiler and are provided with short catch-arms $w$, extending horizontally and designed to turn outward when the vessel $b$ is inclined forward and to turn laterally or backward when said vessel is to be placed in the boiler. The shanks of the handles are designed to slide up and down in the bearings at the ends of the boiler, and they are usually made long enough to allow the handles to extend above the boiler-wall. They serve, therefore, not only as lifters for the vessel $b$ and as means for adjusting the hooks which engage the boiler-rim, but also as levers for turning the vessel $b$ forward in inclined position when required.

Having described the invention, what I claim, and desire to secure by Letters Patent, is—

1. A draining vessel for washboilers having a perforated bottom, and vertically-sliding handles provided with reversed hooks, substantially as specified.

2. A draining vessel for washboilers, having gravity-catches pivoted to the lower longitudinal portion of its wall, and vertically-sliding handles pivoted to the ends and provided with reversed hooks, substantially as specified.

3. The combination with a washboiler, of an inside vessel of similar form having perforations in its bottom, gravity-catches pivoted to the lower longitudinal portion of its wall, and vertically-sliding handle-levers pivoted to the end portion of its wall, and provided with upward-bent ends having reversed hooks, substantially as specified.

In testimony whereof I affix my signature in presence of two witnesses.

OSCAR CARLSON.

Witnesses:
JOHN E. ERICKSON,
C. W. JOHNSON.